United States Patent
Miller et al.

(10) Patent No.: US 11,924,199 B1
(45) Date of Patent: Mar. 5, 2024

(54) SYSTEMS AND METHODS FOR USER AUTHENTICATION USING AN IMAGED MACHINE-READABLE IDENTITY DOCUMENT

(71) Applicant: FMR LLC, Boston, MA (US)

(72) Inventors: Carsten Miller, Cambridge, MA (US); Brett Edminster, York, ME (US)

(73) Assignee: FMR, LLC, Boston, MA (US)

( * ) Notice: Subject to any disclaimer, the term of this patent is extended or adjusted under 35 U.S.C. 154(b) by 0 days.

(21) Appl. No.: 18/195,698

(22) Filed: May 10, 2023

(51) Int. Cl.
*H04L 9/40* (2022.01)

(52) U.S. Cl.
CPC ........ *H04L 63/0846* (2013.01); *H04L 63/102* (2013.01)

(58) Field of Classification Search
CPC .......................... H04L 63/0846; H04L 63/102
See application file for complete search history.

(56) References Cited

U.S. PATENT DOCUMENTS

| | | | |
|---|---|---|---|
| 8,738,527 B2 | 5/2014 | Kalinichenko et al. | |
| 8,959,584 B2 | 2/2015 | Piliouras | |
| 9,779,405 B1 * | 10/2017 | Krausz | H04W 12/041 |
| 9,853,968 B2 | 12/2017 | Shen et al. | |
| 10,255,419 B1 | 4/2019 | Kragh | |
| 10,375,063 B2 | 8/2019 | Rotem et al. | |
| 10,587,609 B2 | 3/2020 | Ebrahimi et al. | |
| 11,100,572 B1 | 8/2021 | Hecht et al. | |
| 11,405,189 B1 * | 8/2022 | Bennison | H04L 9/0656 |
| 11,544,779 B2 | 1/2023 | Spector et al. | |
| 2014/0365780 A1 * | 12/2014 | Movassaghi | H04L 9/3228 713/184 |
| 2015/0195276 A1 | 7/2015 | Buer et al. | |
| 2015/0269433 A1 | 9/2015 | Amtrup et al. | |
| 2016/0012433 A1 * | 1/2016 | Marenick | G06Q 20/409 705/72 |
| 2018/0219859 A1 | 8/2018 | Grunin et al. | |
| 2018/0241745 A1 | 8/2018 | Laporta | |
| 2020/0226605 A1 * | 7/2020 | Walters | G06Q 20/4015 |
| 2020/0259825 A1 * | 8/2020 | Van Prooijen | H04L 63/0861 |
| 2022/0138298 A1 * | 5/2022 | Law | G06F 21/32 726/7 |

(Continued)

*Primary Examiner* — Harris C Wang
(74) *Attorney, Agent, or Firm* — Cesari and McKenna, LLP

(57) ABSTRACT

Described herein are computerized methods and systems for user authentication using an imaged machine-readable identity document. A server receives an authentication request from a first client device, including image files corresponding to a user's machine-readable identity document. The server displays on the first client device user-identifying data elements extracted from the image files. The server captures additional user-identifying data elements from the first client device, and verifies the user's identity based upon the user-identifying data elements. The server determines user contact channel data based upon the verified identity. The server displays the contact channel data on the first client device, and generates a transient access code upon receiving a contact channel selection. The server transmits the access code to a second client device corresponding to the contact channel selection, and connects the first client device to a secure resource upon validating the access code from the first client device.

26 Claims, 8 Drawing Sheets

(56) References Cited

U.S. PATENT DOCUMENTS

| | | | |
|---|---|---|---|
| 2022/0253837 A1* | 8/2022 | Schneider | G06Q 20/065 |
| 2022/0345309 A1* | 10/2022 | Rule | G06F 21/35 |
| 2023/0155812 A1* | 5/2023 | Bennison | H04L 63/0861 |
| | | | 713/171 |
| 2023/0155833 A1* | 5/2023 | Smets | H04L 9/3236 |
| | | | 713/189 |

\* cited by examiner

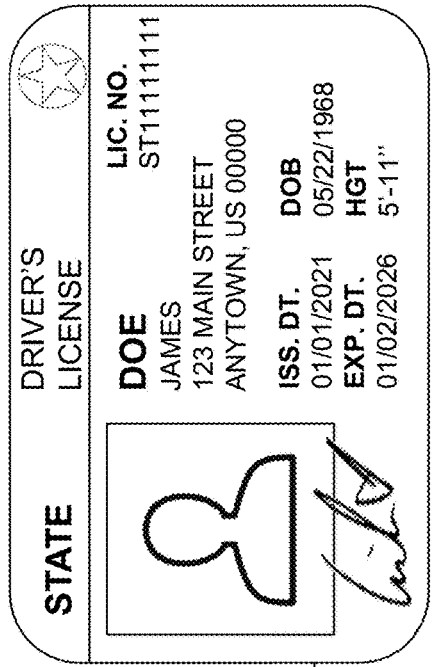
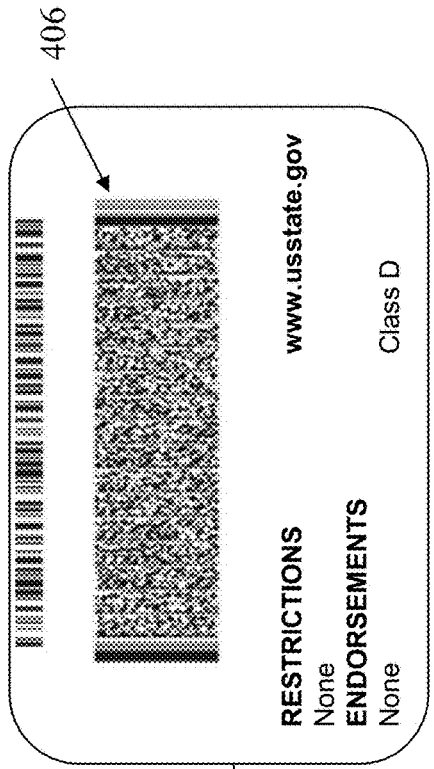
FIG. 4

FIG. 5

PLEASE VERIFY THE FOLLOWING INFORMATION CAPTURED FROM YOUR ID:

First Name: James
Last Name: Doe
Date of Birth: 05/22/1968
Address: 123 Main Street Anytown, US 00000

PLEASE PROVIDE THE FOLLOWING ADDITIONAL INFORMATION:

Last 4 of SSN: 0000
Account No.: X12345

[Cancel] [Submit]

FIG. 6

PLEASE SELECT A METHOD OF RECEIVING YOUR
ONE-TIME ACCESS CODE:

Text : 617-555-1212
Call: 617-555-1212
Email: jdoe@xyz.com 602
604
606

Submit
Cancel

600

SYSTEMS AND METHODS FOR USER AUTHENTICATION USING AN IMAGED MACHINE-READABLE IDENTITY DOCUMENT

TECHNICAL FIELD

The subject matter of the application relates generally to methods and systems for user authentication using an imaged machine-readable identity document.

BACKGROUND

Verification of a person's identity is an important prerequisite for many different computing functions, such as accessing sensitive and/or personal information, executing legal documents, and initiating financial transactions. Generally, modern computing systems verify a user's identity by asking the user to provide authentication credentials (e.g., username and password) when requesting access to a secure application. The computing system then validates the provided authentication credentials to verify the identity of the user and to confirm the user's entitlement to access the requested application. In one example, a user connecting to the website of their financial institution to conduct one or more transactions is required to log in before the website enables certain functionality or reveals sensitive information. Often, users will maintain a variety of authentication credentials that are each used with different service providers, applications, and/or accounts. However, users may be prone to forgetting which credentials correspond to each secure resource.

This problem is especially acute in the context of on-premises user authentication. For example, a user may visit a physical location (e.g., branch or service center) of their financial institution in order to meet with an advisor in person, receive specific advice and services, or access certain information. During the visit, the user may want to initiate one or more transactions or access sensitive account information using computing systems available at the location. If the user cannot remember their authentication credentials at that moment, the user will have to complete an authentication credential retrieval and/or reset process on the computing system. This process can add unnecessary time to the visit and lead to user frustration and dissatisfaction. In addition, when the user later returns home and wants to access the financial institution website, the user may not remember the details of the authentication credential change that they performed at the physical location. The user must go through the authentication credential reset process again, exacerbating the user's displeasure.

Another way to verify the identity of a user is through the inspection of official identity documents, such as government-issued identification cards, driver's licenses, passports, and similar credentials. However, existing computing systems are typically not configured to perform this type of inspection and verification as part of a password-less, mobile device-based user authentication workflow in order to provide access to secure computing resources and applications.

SUMMARY

Therefore, what is needed are methods and systems for authenticating users to access secure computing systems through the verification of a user's identity documents and without necessitating a change in the user's existing computing system authentication credentials such as username and password. The techniques described herein advantageously provide for a secure, multi-factor, multi-device authentication workflow that captures specific user-identifying elements from a machine-readable identity document to seamlessly verify the user's identity and authenticate the user for access to secure computing resources.

The invention, in one aspect, features a system for user authentication using an imaged machine-readable identity document. The system includes a server computing device having a memory for storing computer executable instructions and a processor that executes the computer executable instructions. The server computing device receives a user authentication request from a first client computing device, the user authentication request including one or more image files corresponding to a machine-readable identity document of a user of the first client computing device. The server computing device displays one or more user-identifying data elements on the first client computing device, at least a portion of the user-identifying data elements being extracted from the image files. The server computing device captures one or more additional user-identifying data elements input by the user of the first client computing device. The server computing device verifies the identity of the user based upon the extracted user-identifying data elements and the additional captured user-identifying data elements. The server computing device determines user contact channel data for the user based upon the verified identity of the user. The server computing device displays at least a portion of the user contact channel data on the first client computing device. The server computing device generates a transient access code upon receiving a user contact channel selection from the first client computing device and transmits the transient access code to a second client computing device corresponding to the user contact channel selection. The server computing device connects the first client computing device to a secure computing resource upon receiving the transient access code from the first client computing device and validating the transient access code.

The invention, in another aspect, features a computerized method of user authentication using an imaged machine-readable identity document. A server computing device receives a user authentication request from a first client computing device, the user authentication request including one or more image files corresponding to a machine-readable identity document of a user of the first client computing device. The server computing device displays one or more user-identifying data elements on the first client computing device, at least a portion of the user-identifying data elements being extracted from the image files. The server computing device captures one or more additional user-identifying data elements input by the user of the first client computing device. The server computing device verifies the identity of the user based upon the extracted user-identifying data elements and the additional captured user-identifying data elements. The server computing device determines user contact channel data for the user based upon the verified identity of the user. The server computing device displays at least a portion of the user contact channel data on the first client computing device. The server computing device generates a transient access code upon receiving a user contact channel selection from the first client computing device and transmits the transient access code to a second client computing device corresponding to the user contact channel selection. The server computing device connects the first client computing device to a secure computing resource upon receiving the transient access code from the first client computing device and validating the transient access code.

Any of the above aspects can include one or more of the following features. In some embodiments, the first client computing device captures the image files corresponding to the identity document after initiation of the user authentication request at the first client computing device. In some embodiments, the identity document comprises an identification card or a driver's license. In some embodiments, the user-identifying data elements extracted from the image file comprise one or more of: a first name, a last name, a date of birth, a mailing address, a document number associated with the identity document, or a barcode associated with the identity document.

In some embodiments, the additional user-identifying data elements comprise at least a portion of a personal identification number of the user. In some embodiments, verifying the identity of the user comprises validating the portion of the personal identification number of the user. In some embodiments, the user contact channel data comprises a plurality of contact addresses associated with the user of the first client computing device. In some embodiments, the plurality of contact addresses comprise an email address and a telephone number.

In some embodiments, generating a transient access code for the user upon receiving a user contact channel selection from the first client computing device and transmitting the transient access code to a second client computing device comprises initiating a session with an authentication server associated with the secure computing resource and requesting the transient access code from the authentication server. In some embodiments, connecting the first client computing device to a secure computing resource upon receiving and validating the transient access code from the first client computing device comprises transmitting the transient access code received from the first client computing device to the authentication server, receiving a determination from the authentication server that the transient access code is valid, and establishing a connection between the first client computing device and the secure computing resource. In some embodiments, the server computing device displays an error message on the first client computing device when the authentication server determines that the transient access code is invalid.

In some embodiments, the server computing device validates authenticity of the identity document of the user as represented in the image file prior to displaying the extracted user-identifying data elements on the first client computing device. In some embodiments, the transient access code expires after a predetermined amount of time.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is a diagram of exemplary front and back images of an identity document as captured by an image capture module of a mobile computing device.

FIG. 5 is a diagram of an exemplary user interface for displaying extracted user-identifying data elements on a mobile computing device.

FIG. 6 is a diagram of an exemplary user interface for displaying user contact channel data on a mobile computing device.

DETAILED DESCRIPTION

Figure 1:
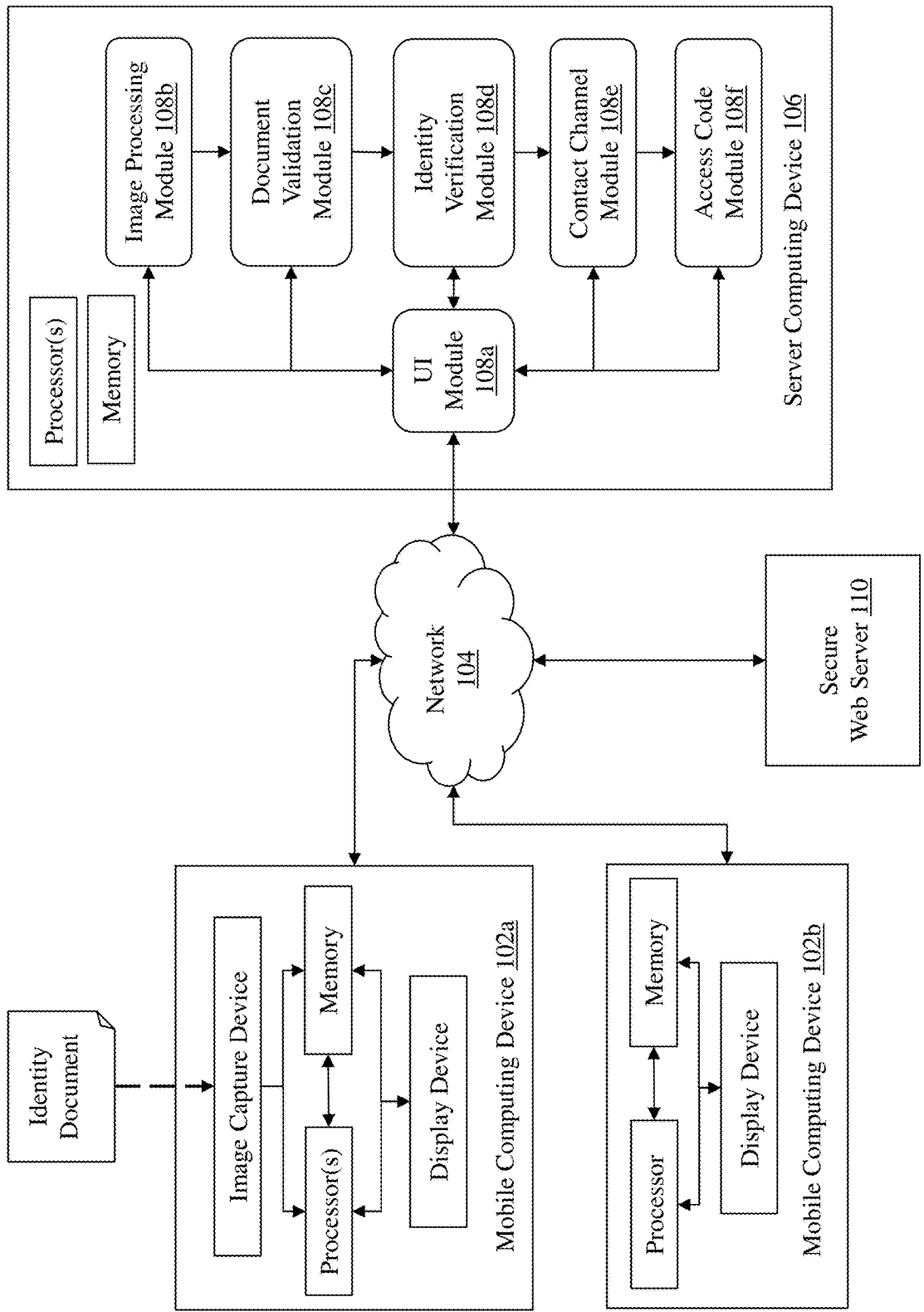
FIG. 1 is a block diagram of a system for user authentication using an imaged machine-readable identity document.

FIG. 1 is a block diagram of a system 100 for user authentication using an imaged machine-readable identity document. System 100 includes a first mobile computing device 102a that comprises several components including an image capture device, one or more processors, a memory, and a display device. System 100 also includes a second mobile computing device 102b that comprises several components including one or more processors, a memory, and a display device. System 100 also includes server computing device 106 that comprises one or more processors, memory, and a plurality of modules including user interface (UI) module 108a, image processing module 108b, document validation module 108c, identity verification module 108d, contact channel module 108e, and access code module 108f. System 100 further includes a secure computing resource 110, such as a web server that provides application functionality and content to mobile computing device 102a. Mobile computing devices 102a, 102b, server computing device 106, and secure web server 110 are coupled together via network 104.

Mobile computing devices 102a, 102b are physical devices that include specialized hardware and/or software modules that execute on processor(s) and interact with memory in the respective devices, to receive, process, and transmit data, and perform functions for user authentication using an imaged machine-readable identity document as described herein. In some embodiments, mobile computing devices 102a, 102b include one or more software applications installed on the devices to carry out functions for user authentication using an imaged machine-readable identity document as described herein.

Mobile computing device 102a also comprises an image capture device. In some embodiments, the image capture device comprises a camera that is capable of capturing video and/or still images of a scene. For example, a user of mobile computing device 102a may place an identity document (such as a driver's license or government ID) in the field of view of the image capture device and instruct mobile computing device 102a to capture an image of the document and/or record video of the document using the image capture device. As shown in FIG. 1, the image capture device is integrated into mobile computing device 102a—an example might be a smartphone that includes an embedded camera. It should be appreciated that in other embodiments, the image capture device may be a device that is separate from mobile computing device 102a, and which is coupled to mobile computing device 102a via a wired or wireless connection.

Mobile computing devices 102a, 102b also include a display device (e.g., an embedded screen) that is configured to display user interface elements and other content to a user of the respective device 102a, 102b. In some embodiments, the display device also comprises touchscreen elements to provide for receipt of user input. Exemplary mobile computing devices 102a, 102b include, but are not limited to, tablets (e.g., Apple® iPad®, Android™-based devices), smartphones (Apple® iPhone®, Android™-based devices), laptop computers, and the like. It should be appreciated that other types of computing devices (e.g., desktop computers, Internet of Things (IoT) devices, smart appliances, wearables) that are capable of connecting to the components of system 100 can be used without departing from the scope of invention. Although FIG. 1 depicts two mobile computing devices 102a, 102b, it should be appreciated that system 100 can include any number of mobile computing devices.

As mentioned above, in some embodiments mobile computing devices 102a, 102b can include one or more applications that are installed on the devices—also called native applications or "apps." A native application can be a software application that is installed locally on mobile computing device 102a, 102b and written with programmatic code designed to interact with an operating system that is native to mobile computing device 102a, 102b. Such software may be available for download onto devices 102a, 102b from, e.g., the Apple® App Store or the Google® Play Store. In some embodiments, native applications can be executed when mobile computing device 102a, 102b is online—that is, communicatively coupled to network 104—or offline.

It should be appreciated that, in some embodiments, mobile computing devices 102a, 102b can include a browser application, which comprises software executing on one or more processors of mobile computing devices 102a, 102b that enables the mobile computing device to communicate via HTTP or HTTPS with remote servers addressable with URLs (e.g., server computing device 106 and secure web server 110) to receive application-related content, including one or more webpages that contain user interface content, for rendering in the browser application and presentation on the display device coupled to mobile computing device 102a, 102b. Exemplary mobile browser application software includes, but is not limited to, Firefox™, Chrome™, Safari™, and other similar software. The one or more webpages can comprise interactive or non-interactive visual and audio content for display to and interaction with a user of device 102a, 102b, including application functionality for user authentication as described herein.

Communications network 104 enables the other components of system 100 to communicate with each other in order to perform the process of user authentication using an imaged machine-readable identity document as described herein. Network 104 may be a local network, such as a LAN, or a wide area network, such as the Internet and/or a cellular network. In some embodiments, network 104 is comprised of several discrete networks and/or sub-networks (e.g., cellular to Internet) that enable the components of system 100 to communicate with each other.

Server computing device 106 is a combination of hardware, including one or more special-purpose processors and one or more physical memory modules, and specialized software modules that execute on one or more processors of server computing device 106, to receive data from and transmit data to other components of system 100, and perform functions for user authentication using an imaged machine-readable identity document as described herein. As mentioned above, server computing device 106 includes UI module 108a, image processing module 108b, document validation module 108c, identity verification module 108d, contact channel module 108e, and access code module 108f. In some embodiments, that execute on the processor of the server computing device 106. In some embodiments, modules 108a-108f are specialized sets of computer software instructions programmed onto one or more dedicated processors in server computing device 106 and can include specifically designated memory locations and/or registers for executing the specialized computer software instructions.

Although modules 108a-108f are shown in FIG. 1 as executing within the same server computing device 106, in some embodiments the functionality of modules 108a-108f can be distributed among a plurality of server computing devices. As shown in FIG. 1, server computing device 106 enables modules 108a-108f to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. In some embodiments, the functionality of one or more modules 108a-108f can be located on a remote computing resource that is accessible to server computing device 106 via a communication interface, such as an application programming interface (API). For example, server computing device 106 can issue one or more API calls to the remote computing resource to access and execute functionality incorporated in one or more of modules 108a-108f. The exemplary functionality of modules 108a-108f is described in detail below.

Figure 2:
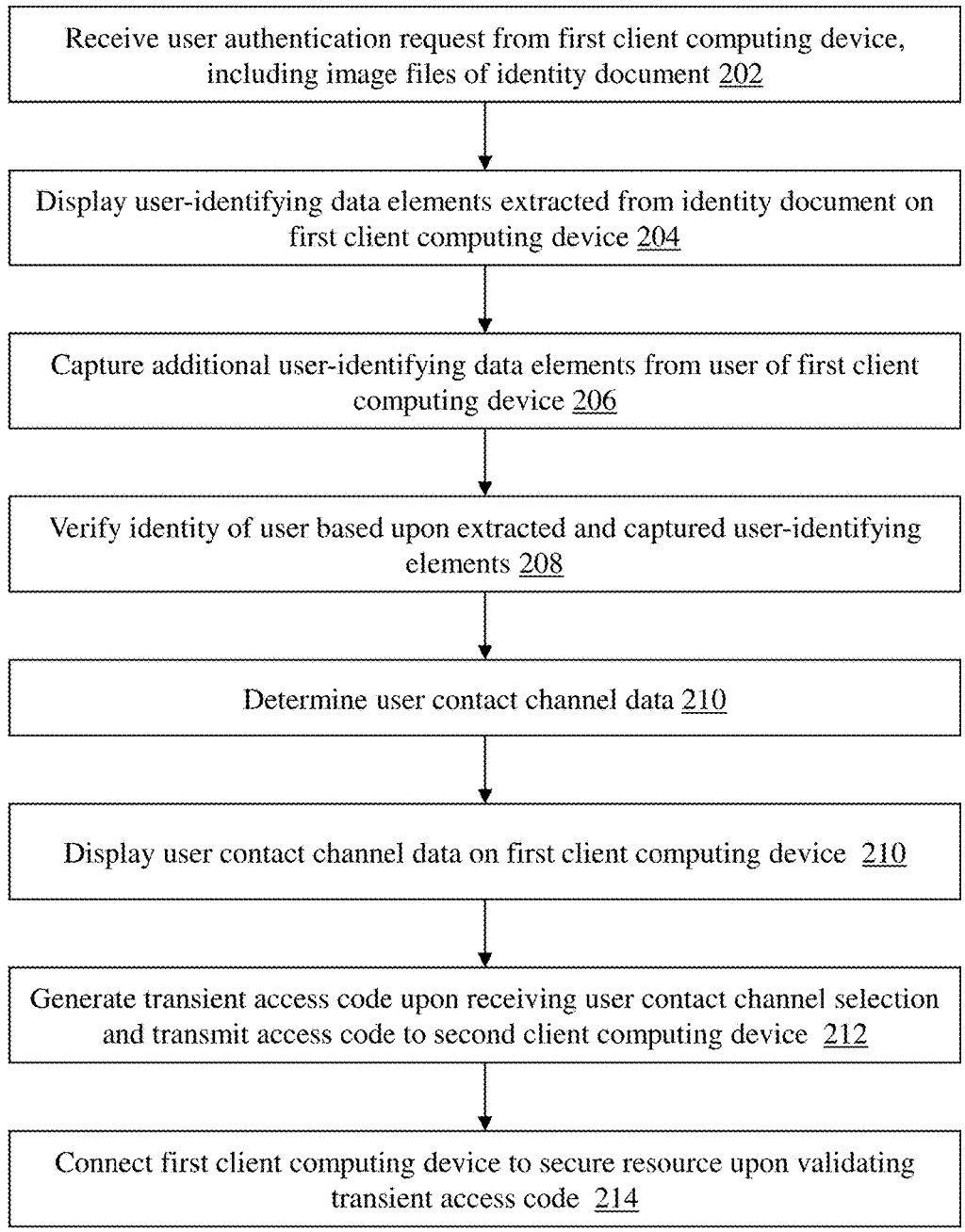
FIG. 2 is a flow diagram of a computerized method of user authentication using an imaged machine-readable identity document.

FIG. 2 is a flow diagram of a computerized method 200 of user authentication using an imaged machine-readable identity document, as performed by system 100 of FIG. 1. The technology described herein is presented in the context of an exemplary use case, namely, a customer at a physical location (e.g., branch office or customer service center) of a financial institution that needs to log in to a secure computing resource but cannot remember their authentication credentials. It should be appreciated that this use case is just an example and that many other applications of this technology can be envisioned within the scope of invention described herein.

Figure 3:
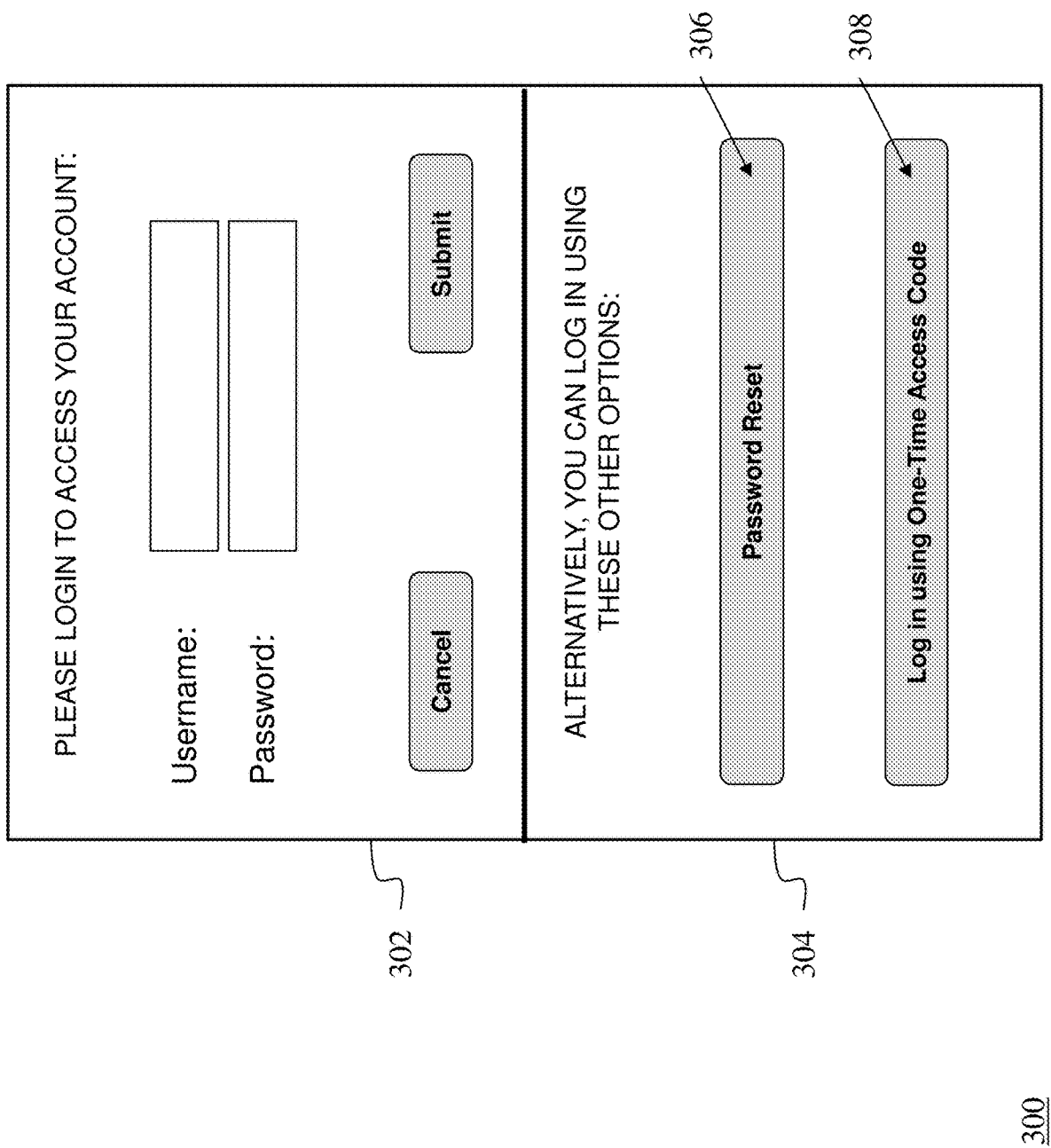
FIG. 3 is a diagram of an exemplary login user interface screen displayed on a mobile computing device.

In many cases, the customer is provided with a mobile computing device 102a (e.g., tablet, mobile device) for use during the visit by an employee at the physical location. Mobile computing device 102a is configured with application software that enables the customer to access their accounts, electronically sign documents, initiate one or more transactions, and other types of activities that require authentication of the customer. Mobile computing device 102a may ask the customer to log in using authentication credentials (e.g., username and password) that have previously been generated and used by the customer—for example, the customer may use the same credentials for logging in to the financial institution's website from home. FIG. 3 is a diagram of an exemplary login user interface screen 300 displayed on mobile computing device 102a. As shown in FIG. 3, the user interface 300 includes area 302 that enables the customer to enter their username and password to proceed. However, as mentioned above, the customer may not remember the specific authentication credentials needed in order to log into mobile computing device 102*a*. In existing systems, the customer would be required to go through an extensive credential reset process that would unnecessarily extend the visit and would lead to customer dissatisfaction. In addition, the customer would be required to remember the new authentication credentials that they created during the visit when returning home—which could lead to additional difficulty accessing the desired applications. The user interface 300 in FIG. 3 does allow the customer to start the password reset process by interacting with button 306.

However, to overcome the above-identified problems, the user interface 300 advantageously provides for a user authentication workflow using a one-time access code in combination with the customer's existing identity documents (e.g., passport, driver's license, government ID). This user authentication workflow verifies the customer's identity and enables the customer to access computing resources such as the financial institution's secure website via mobile computing device 102*a*—without forcing the customer to reset their existing authentication credentials. The customer can initiate this improved user authentication workflow by interacting with button 308 in UI 300.

Turning back to FIG. 2, server computing device 106 receives (step 202) a user authentication request from mobile computing device 102*a*. The user authentication request includes one or more image files corresponding to a machine-readable identity document of the customer. Server computing device 106 establishes a connection to mobile computing device 102*a* and instructs mobile computing device 102*a* to start the authentication process. UI module 108*a* of server computing device 106 provides a UI screen that prompts the customer to capture one or more images of their identity document using, e.g., image capture device of mobile computing device 102*a*. Typically, the customer (or a service representative at the physical location) holds the customer's identity document in front of the image capture device and aligns the identity document with one or more UI elements (e.g., a boundary box) presented on the display screen. The customer then presses a button in the mobile computing device 102*a* UI to initiate capture of the image(s). Mobile computing device 102*a* can determine (i) that the identity document is aligned with the UI elements and (ii) that the image capture device has the identity document properly in focus before capturing the image(s). The identity document images can be captured and stored on mobile computing device 102*a* in any number of different document and/or file formats, including but not limited to: JPEG, TIFF, PNG, GIF, PDF, H.264, and other types of compressed and/or uncompressed file formats.

In some embodiments, server computing device 106 can instruct mobile computing device 102*a* to capture images corresponding to both the front side and the back sides of the identity document. FIG. 4 is a diagram of front and back images of an exemplary identity document captured by mobile computing device 102*a*. As shown in FIG. 4, the identity document is a driver's license. The front side 402 includes user-identifying data elements such as first and last name, address, date of birth, and document ID. The front side 302 also includes a photograph of the customer's face. In some embodiments, the identity document includes one or more features that enable the document to be machine-readable. For example, the back side 404 of the driver's license includes a machine-readable zone (MRZ) 406 encoded with document-specific information that can be read and processed in order to validate the user's identity as will be described below. Other types of machine-readable features can be contemplated within the scope of the technology described herein.

Once the image(s) of the identity document are captured, mobile computing device 102*a* transmits the image(s) along with a user authentication request to server computing device 106. In some embodiments, the user authentication request is received by image processing module 108*b* via UI module 108*a*. Image processing module 108*b* analyzes the image(s) of the identity document received from mobile computing device 102*a* to extract one or more user-identifying data elements from the image(s). In some embodiments, image processing module 108*b* uses a document scanning function to identify portions of the image(s) that comprise text elements and extract the corresponding text. An exemplary document scanning function used by image processing module 108*b* is the BlinkID™ platform available from Microblink of Brooklyn, New York.

In some embodiments, mobile computing device 102*a* is configured to capture the image(s) at a defined quality (e.g., minimum resolution and/or image size) so that the identity document can be successfully processed by image processing module 108*b*. However, in some instances, the image(s) captured by mobile computing device 102*a* may be degraded or low quality—which lessens the accuracy of computerized document scanning techniques to extract text from the image(s). In these scenarios, image processing module 108*b* can perform one or more image processing functions (such as sharpening, filtering, scaling, changing contrast, binarization, etc.) on the entire image or a cropped portion of the image, to enhance the detectability of the text in the image. Then, image processing module 108*b* can utilize one or more document scanning algorithms to extract the text from the image.

In some embodiments, one or more of the images of the identity document are provided to document validation module 108*c* as part of a fraud detection process. Document validation module 108*c* is configured to analyze the structure, format, and/or appearance of the identity document depicted in the image(s) and confirm that the imaged identity document has features consistent with those found in real identity documents of the same type (e.g., by the same issuing authority, of the same nationality, etc.). In some embodiments, document validation module 108*c* utilizes templates or samples associated with known identity documents of the same type in order to analyze the presented identity document. An exemplary document validation function used by document validation module 108*c* is the BlinkID™ platform described above. Document validation module 108*c* can analyze features such as data format, data location, font style, font size, and other features relating to the appearance of text in the identity document. Document validation module 108*c* can also analyze holograms, optically variable devices (OVD), or other security features on the document to determine that the security features are present and accurate (and not tampered with). Document validation module 108*c* can also perform certain data logic checks—such as checking an expiration date in the document and/or validating check digits in an MRZ, among others. In some embodiments, document validation module 108*c* can capture the MRZ and/or data associated with the MRZ for transmission to a remote computing resource (such as an issuing authority database) for validation.

As can be appreciated, a portion of (or the entirety of) the functionality of image processing module 108*b* and document validation module 108*c* can be located on mobile computing device 102*a* instead of server computing device 106. For example, mobile computing device 102a include the BlinkID™ mobile software development kit (SDK) which is configured to analyze the images of the identity document, extract user-identifying data elements from the images, and validate the authenticity of the identity document prior to transmitting the user authentication request to server computing device 106. In this example, mobile computing device 102a can transmit some or all of the extracted user-identifying data elements (e.g., first name, last name, date of birth, address, document ID) as payload data to server computing device 106—instead of transmitting the actual document images. This approach can conserve network bandwidth by avoiding the transmission of large image files over network 104. In some embodiments, mobile computing device 102a is configured to perform the image processing and document validation functions entirely on mobile computing device 102a (e.g., using a pre-installed SDK). These embodiments provide the advantage of keeping the customer's personally identifiable information secure and located only on mobile computing device 102a. In some embodiments, once the image processing and document validation are complete and the necessary information has been transmitted to server computing device 106, mobile computing device 102a can delete the identity document images and any extracted information from memory to ensure that the customer's information cannot be retrieved, copied, or otherwise accessed.

In some embodiments, a portion of (or the entirety of) the functionality of image processing module 108b and document validation module 108c can be located on a remote computing device (not shown) separate from server computing device 106 which is coupled to mobile computing device 102a and server computing device 106 via network 104. For example, mobile computing device 102a and/or server computing device 106 can be configured to establish a secure connection to a remote document validation server that provides the image processing and document validation functionality described herein. The remote document validation server can return one or more user-identifying data elements extracted from the identity document images back to mobile computing device 102a and/or server computing device 106 to continue with the user authentication process described herein.

Also, as can be appreciated, in some embodiments the image processing and/or document validation functionality described herein is not performed. For example, a service representative at the physical location may be trained to manually inspect the identity document presented by the user to confirm that the document is legitimate and has not been tampered with. In another example, the service representative may personally know the customer through prior interactions and be able to independently verify the customer's identity based on the prior interactions. In these examples, the user authentication workflow can be adjusted to proceed from image capture and data extraction directly to the identity verification processing described below.

Once the image processing, data extraction, and document validation functionality as described above is complete, UI module 108a of server computing device 106 communicates with mobile computing device 102a to display (step 204) one or more user-identifying data elements on mobile device 102a, where at least a portion of the user-identifying data elements are extracted from the image(s) of the identity document. FIG. 5 is a diagram of an exemplary user interface 500 displaying the extracted user-identifying data elements to the customer at mobile computing device 102a. As shown in FIG. 5, the user-identifying data elements extracted from the imaged identity document are displayed in area 502 of the UI. In some embodiments, the text fields containing the extracted data elements are read-only—i.e., the customer does not have the ability to edit the data. Also, in some embodiments the UI 500 can be configured to display at least a portion of the captured identity document image(s) so the customer can visually confirm that the document was captured correctly.

The UI also comprises area 504 which contains one or more text fields in which the customer is prompted to provide additional user-identifying data elements (e.g., last four digits of the customer's social security number (SSN), customer's account number) that can be used to verify the customer's identity. The data elements requested in area 504 may correspond to certain pieces of information required by the financial institution in order to (i) verify that the user of mobile computing device 102a is a customer of the financial institution and/or (ii) confirm and retrieve user-specific information, including but not limited to user profile data, user contact data, financial account data, user entitlements and permissions, transaction limits or restrictions, and so forth. In some embodiments, the data elements requested in area 504 can provide a further layer of identity verification and security to the user authentication workflow process. For example, when a customer is unable to provide the correct partial SSN, server computing device 106 can terminate the user authentication workflow and instruct mobile computing device 102a to display a screen that directs the customer to a service representative for assistance.

Upon entering the required information, the customer can interact with the "Submit" button 506 which provides for transmission of the user-identifying information to identity verification module 108d of server computing device 106 via UI module 108a. Identity verification module 108d captures (step 206) the one or more additional user-identifying data elements input by the customer at mobile computing device 102a and initiates a process to verify (step 208) the identity of the customer based upon the user-identifying data elements extracted from the imaged identity document and the additional user-identifying data elements provided as input by the customer. In some embodiments, identity verification module 108d validates one or more of the extracted data elements and the additional data elements using, e.g., a customer repository stored in an external database. For example, the financial institution can store certain information for each customer in a customer profile that is accessible by identity verification module 108d. The customer profile information can include, but is not limited to, user identity information (e.g., name, partial SSN), address, information, demographic information (e.g., gender, marital status, age), account information, user contact information (e.g., mobile phone number, email address), transaction history, user preferences, and similar information. Identity verification module 108d retrieves customer profile information from the repository using one or more of the user-identifying data elements received from mobile computing device 102a. For example, module 108d can use the account number or partial SSN entered by the customer to locate the associated customer profile in the repository. Module 108d then compares one or more of the extracted user-identifying data elements and the additional user-identifying data elements to corresponding information stored in the customer profile to verify the customer's identity. In an example, module 108d can compare the first name and last name extracted from the imaged identity document to the first name and last name stored in the profile using, e.g., a text string comparison algorithm. When module 108d confirms that the information matches, module 108*d* can retrieve the customer profile information and transmit indicia to UI module 108*a* that the customer's identity has been verified and the user authentication workflow can proceed to the next step. When module 108*d* determines that the user-identifying information received from mobile computing device 102*a* does not match, module 108*d* can transmit indicia to UI module 108*a* that the customer's identity is not verified. UI module 108*a* can then communicate the verification result to mobile computing device 102*a*—for example, UI module 108*a* can instruct mobile computing device 102*a* to display a screen that asks the customer to re-initiate the image capture and/or additional information entry processes and/or informs the customer that an error has occurred, instructing the customer to ask for assistance from a service representative.

When the customer's identity has been successfully verified, contact channel module 108*e* analyzes the customer profile information to determine (step 210) user contact channel data for the customer. As mentioned above, the customer profile can include one or more pieces of contact information for the customer—such as mobile phone numbers or email addresses. Contact channel module 108*e* can retrieve this contact information from the customer profile for use in transmission of a one-time access code to a personal computing device (e.g., mobile computing device 102*b*) associated with the customer. In some embodiments, a customer's profile information may include a plurality of different contact channels—e.g., one or more mobile phone numbers and one or more email addresses. Module 108*e* can retrieve some or all of the contact channels and continue the user authentication workflow as described below. In some embodiments, module 108*e* can select a subset of the contact channels based upon, e.g., customer preference information—for example, a customer profile may include a flag that identifies a particular mobile device phone number as their preferred contact number. Therefore, module 108*e* can select the preferred phone number and discard any remaining phone numbers. In the event that the customer does not have any contact channels available in their customer profile information, contact channel module 108*e* can transmit a notification to UI module 108*a*—which instructs mobile computing device 102*a* to display a message to the customer asking them to seek assistance from a service representative.

Once contact channel module 108*e* has determined the user contact channel data for the customer, UI module 108*a* instructs mobile computing device 102*a* to display (step 212) at least a portion of the user contact channel data. FIG. 6 is a diagram of an exemplary user interface 600 for displaying the user contact channel data on mobile computing device 102*a*. As shown in FIG. 6, UI 600 includes a plurality of text fields 602 each corresponding to one of the contact channels retrieved from the customer profile—i.e., a mobile device phone number and an email address. As can be appreciated, a single contact channel can be utilized via different mechanisms—for example, a mobile device phone number can be used to send a text message or SMS message to the mobile computing device 102*b* that contains a one-time access code, or to place a call to the mobile device 102*b* with a voice message that speaks the one-time access code to the customer. Each contact channel displayed in UI 600 is associated with an input selection element 604 (e.g., a radio button) that enables the customer to select one of the contact channels to which the one-time access code will be transmitted. In this example, the customer has selected to receive a text message to their mobile device phone number. Upon selecting a contact channel, the customer can interact with the "Submit" button 606 to transmit their selection to contact channel module 108*e* via UI module 108*a*.

Access code module 108*f* receives the contact channel selection from mobile computing device 102*a* and generates (step 214) a transient access code for transmission to the mobile computing device (i.e., device 102*b*) corresponding to the user contact channel selection. Generally, the transient access code (also called a one-time access code, a one-time password (OTP), a secure access code, or a two-factor (2F) verification code) is a short, alphanumeric text string that can only be used once after which the code is no longer valid. In addition, the access code automatically expires after a predetermined amount of time (e.g., one minute, five minutes, ten minutes, etc.) if not used. Module 108*f* can generate a transient access code using one or more specialized algorithms, including but not limited to Message Authentication Code (MAC) algorithms, or Hashed MAC algorithms. Often, the transient access code is generated using a moving factor such as time-based information or an event counter. In some embodiments, access code module 108*f* can communicate with an external secure computing resource (e.g., via application programming interface (API)) to request the one-time access code from the external resource.

Figure 7:
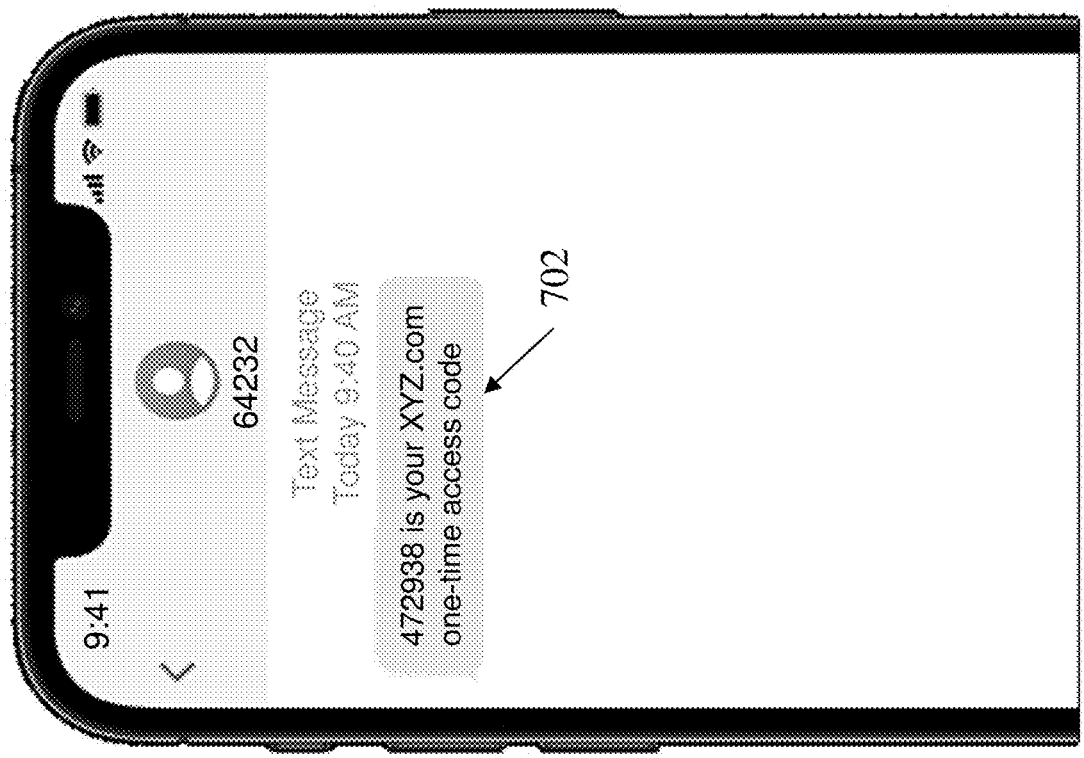
FIG. 7 is a diagram of an exemplary user interface for displaying a text message containing a transient access code on a mobile computing device.

After generating the transient access code, access code module 108*f* transmits the transient access code to mobile computing device 102*b* which provides the transient access code to the customer. As mentioned above, in the case where the customer selects to receive a text message via a mobile phone number contact channel, module 108*f* transmits the text message containing the transient access code to mobile computing device 102*b* associated with the mobile phone number. FIG. 7 is a diagram of an exemplary user interface 700 on mobile computing device 102*b* which displays the text message 702 after it is received from access code module 108*f*. As shown in FIG. 7, the text message 702 includes the one-time access code '472938.' As can be appreciated, when the customer opts to receive the transient access code via email, access code module 108*f* sends an email message containing the transient access code to the email account selected by the customer. The customer can then open an email app on mobile computing device 102*b* to read the email and view the access code. Additionally, when the customer opts to receive the transient access code via a phone call, access code module 108*f* generates a digital voice message containing the access code and initiates a phone call to the mobile phone number selected by the customer. When the customer answers the call, access code module 108*f* plays the digital voice message to provide the access code to the customer. Alternatively, access code module 108*f* can play the digital voice message to the mobile device's voicemail function, which records the message for later playback and/or transcription.

Figure 8:
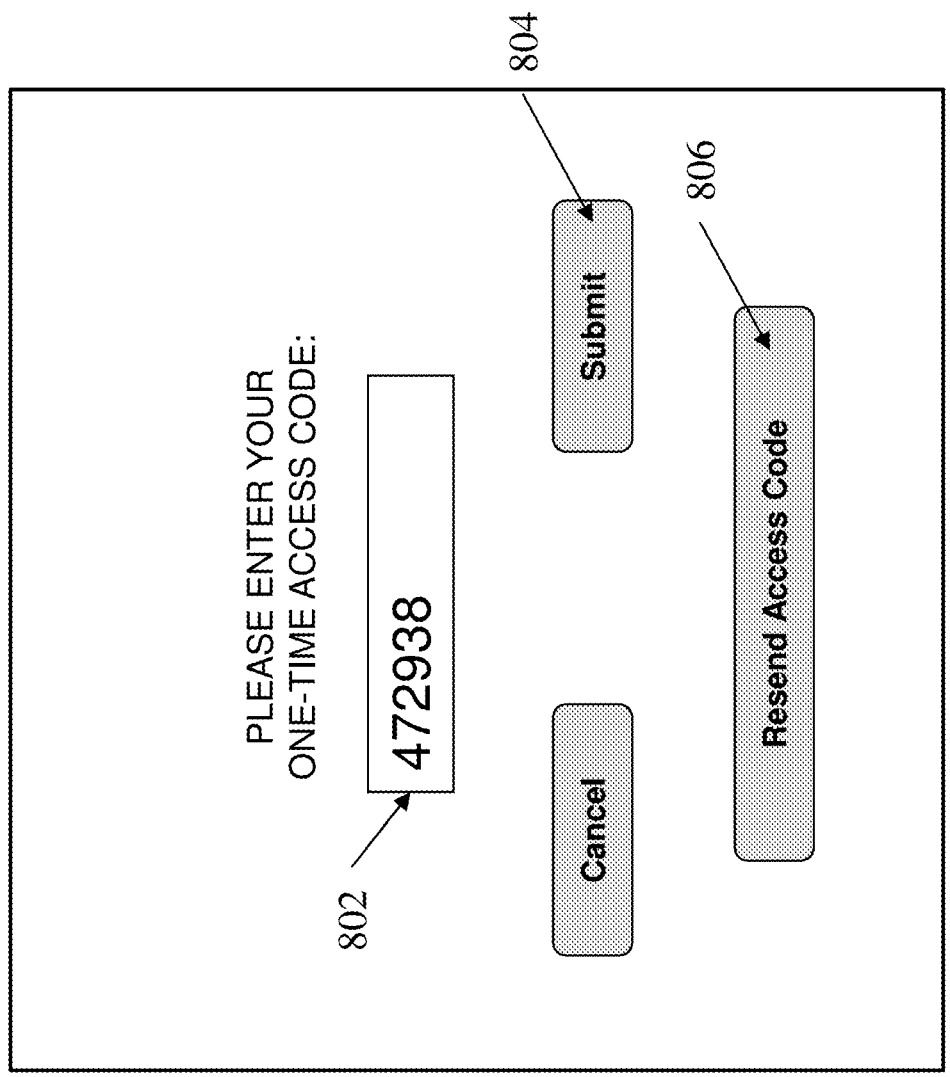
FIG. 8 is a diagram of an exemplary user interface for entry of the transient access code on a mobile computing device.

Upon transmitting the transient access code to mobile computing device 102*b* for display, UI module 108*a* instructs mobile computing device 102*a* to display a UI screen that prompts the customer to enter the transient access code received at mobile computing device 102*b*. FIG. 8 is a diagram of an exemplary user interface 800 for entry of the transient access code on mobile computing device 102*a*. As shown in FIG. 8, UI 800 includes an input text field 802 that enables the customer to enter the transient access code that was received at mobile computing device 102*b*. Upon entering the transient access code, the customer can interact with the "Submit" button 804 to transmit the code back to access code module 108*f* via UI module 108*a*. In some circumstances, due to network delays or other errors, mobile computing device 102*b* may not receive the transient access code from server computing device 106 before the access code expires. The customer can interact with button 806 to instruct access code module 108*f* to generate a new transient access code and send the new access code to mobile computing device 102*b*.

Access code module 108*f* receives the entered access code from mobile computing device 102*a* and validates the access code in order to authenticate the customer. In some embodiments, module 108*f* compares the entered access code to the originally generated access code (e.g., stored in memory of server computing device 106) and determines whether the respective access codes match. When module 108*f* confirms that the access codes match, module 108*f* designates the user and the mobile computing device 102*a* as authenticated for the purposes of accessing secure computing resources such as web server 110. Module 108*f* can instruct mobile computing device 106 to connect (step 216) to the requested secure resource (e.g., secure web server 110) for access to customer-specific information and applications. As mentioned previously, secure web server 110 can host a website that is associated with the financial institution. The website provides functionality to mobile computing device 102*a* which enables the customer to review personal account information, initiate and/or authorize transactions, electronically sign agreements or other documents, among other functions. In some embodiments, after confirming that the access codes match, module 108*f* can procure a server-specific authentication credential from web server 110, which is set as a browser cookie and passed as an authentication header when mobile computing device 102*a* accesses secure web server 110. Upon establishing the connection between mobile computing device 102*a* and secure web server 110, server computing device 106 can end the user authentication workflow.

However, in some instances the customer may not enter the transient access code correctly— which results in a mismatch. When module 108*f* determines that the respective access codes do not match, module 108*f* designates the user and the mobile computing device 102*a* as not authenticated for the purposes of accessing web server 110. In this situation, module 108*f* can instruct mobile computing device 102*a* to prompt the user to re-enter the transient access code and/or to request assistance from a service representative.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, smartphone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing devices include, for example, iOS™-based devices such as the iPhone™ and iPad™ available from Apple, Inc., and Android™-based devices such as the Galaxy™ available from Samsung Corp., the Pixel™ available from Google, Inc., and the Kindle Fire™ available from Amazon, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A system for user authentication using an imaged machine-readable identity document, the system comprising a server computing device having a memory for storing computer executable instructions and a processor that executes the computer executable instructions to:
   receive a user authentication request from a first client computing device, the user authentication request including one or more image files corresponding to a machine-readable identity document of a user of the first client computing device;
   extract user-identifying data elements from at least one of the image files, the user-identifying data elements including a plurality of text fields corresponding to text appearing on the identity document;
   display one or more of the extracted strings on the first client computing device for visual verification by the user;
   capture one or more additional user-identifying data elements input by the user of the first client computing device, wherein one of the additional user-identifying data elements comprises an account number for the user at an organization;
   verify the identity of the user based upon the extracted user-identifying data elements and the captured additional user-identifying data elements, including validating the user as a customer of the organization by comparing the extracted user-identifying data elements and the additional user-identifying data elements to a user profile record maintained by the organization;
   determine user contact channel data for the user from the user profile record after verifying the identity of the user;
   display at least a portion of the user contact channel data on the first client computing device according to user preference information stored in the user profile;
   generate a transient access code upon receiving a user contact channel selection from the first client computing device and transmit the transient access code to a second client computing device corresponding to the user contact channel selection; and
   connect the first client computing device to a secure computing resource upon receiving the transient access code from the first client computing device and validating the transient access code, including setting a authentication credential specific to the secure computing resource on the first client computing device after connecting to the secure computing resource.

2. The system of claim 1, wherein the first client computing device captures the image files corresponding to the identity document after initiation of the user authentication request at the first client computing device.

3. The system of claim 2, wherein the identity document comprises an identification card or a driver's license.

4. The system of claim 1, wherein the user-identifying data elements extracted from the image file comprise one or more of: a first name, a last name, a date of birth, a mailing address, a document number associated with the identity document, or a barcode associated with the identity document.

5. The system of claim 1, wherein the additional user-identifying data elements comprise a partial personal identification number of the user.

6. The system of claim 5, wherein verifying the identity of the user comprises validating the partial personal identification number of the user.

7. The system of claim 1, wherein the user contact channel data comprises a plurality of contact addresses associated with the user of the first client computing device.

8. The system of claim 7, wherein the plurality of contact addresses comprise an email address and a telephone number.

9. The system of claim 1, wherein generating a transient access code for the user upon receiving a user contact channel selection from the first client computing device and transmitting the transient access code to a second client computing device comprises:
   initiating a session with an authentication server associated with the secure computing resource; and
   requesting the transient access code from the authentication server.

10. The system of claim 9, wherein connecting the first client computing device to a secure computing resource upon receiving and validating the transient access code from the first client computing device comprises:
- transmitting the transient access code received from the first client computing device to the authentication server;
- receiving a determination from the authentication server that the transient access code is valid; and
- establishing a connection between the first client computing device and the secure computing resource.

11. The system of claim 10, wherein the server computing device displays an error message on the first client computing device when the authentication server determines that the transient access code is invalid.

12. The system of claim 1, wherein the server computing device validates authenticity of the identity document of the user as represented in the image file prior to displaying the extracted user-identifying data elements on the first client computing device.

13. The system of claim 1, wherein the transient access code expires after a predetermined amount of time.

14. A computerized method of user authentication using an imaged machine-readable identity document, the method comprising:
- receiving a user authentication request from a first client computing device, the user authentication request including one or more image files corresponding to a machine-readable identity document of a user of the first client computing device;
- extracting user-identifying data elements from at least one of the image files, the user-identifying data elements including a plurality of text fields corresponding to text appearing on the identity document;
- displaying one or more of the extracted strings on the first client computing device for visual verification by the user;
- capturing one or more additional user-identifying data elements input by the user of the first client computing device, wherein one of the additional user-identifying data elements comprises an account number for the user at an organization;
- verifying the identity of the user based upon the extracted user-identifying data elements and the captured additional user-identifying data elements, including validating the user as a customer of the organization by comparing the extracted user-identifying data elements and the additional user-identifying data elements to a user profile record maintained by the organization;
- determining user contact channel data for the user from the user profile record after verifying the identity of the user;
- displaying at least a portion of the user contact channel data on the first client computing device according to user preference information stored in the user profile;
- generating a transient access code upon receiving a user contact channel selection from the first client computing device and transmitting the transient access code to a second client computing device corresponding to the user contact channel selection; and
- connecting the first client computing device to a secure computing resource upon receiving the transient access code from the first client computing device and validating the transient access code, including setting a authentication credential specific to the secure computing resource on the first client computing device after connecting to the secure computing resource.

15. The method of claim 14, wherein the first client computing device captures the image files corresponding to the identity document after initiation of the user authentication request at the first client computing device.

16. The method of claim 15, wherein the identity document comprises an identification card or a driver's license.

17. The method of claim 14, wherein the user-identifying data elements extracted from the image file comprise one or more of: a first name, a last name, a date of birth, a mailing address, a document number associated with the identity document, or a barcode associated with the identity document.

18. The method of claim 14, wherein the additional user-identifying data elements comprise a partial personal identification number of the user.

19. The method of claim 18, wherein verifying the identity of the user comprises validating the partial personal identification number of the user.

20. The method of claim 14, wherein the user contact channel data comprises a plurality of contact addresses associated with the user of the first client computing device.

21. The method of claim 20, wherein the plurality of contact addresses comprise an email address and a telephone number.

22. The method of claim 14, wherein generating a transient access code for the user upon receiving a user contact channel selection from the first client computing device and transmitting the transient access code to a second client computing device comprises:
- initiating a session with an authentication server associated with the secure computing resource; and
- requesting the transient access code from the authentication server.

23. The method of claim 22, wherein connecting the first client computing device to a secure computing resource upon receiving and validating the transient access code from the first client computing device comprises:
- transmitting the transient access code received from the first client computing device to the authentication server;
- receiving a determination from the authentication server that the transient access code is valid; and
- establishing a connection between the first client computing device and the secure computing resource.

24. The method of claim 23, wherein the server computing device displays an error message on the first client computing device when the authentication server determines that the transient access code is invalid.

25. The method of claim 14, wherein the server computing device validates authenticity of the identity document of the user as represented in the image file prior to displaying the extracted user-identifying data elements on the first client computing device.

26. The method of claim 14, wherein the transient access code expires after a predetermined amount of time.

* * * * *